United States Patent
Cunningham

(10) Patent No.: US 12,026,602 B1
(45) Date of Patent: Jul. 2, 2024

(54) VEHICLE DAMAGE CLAIMS SELF-SERVICE

(71) Applicant: STATE FARM MUTUAL AUTOMOBILE INSURANCE COMPANY, Bloomington, IL (US)

(72) Inventor: Jeremy T. Cunningham, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 665 days.

(21) Appl. No.: 16/529,056

(22) Filed: Aug. 1, 2019

Related U.S. Application Data

(60) Provisional application No. 62/713,355, filed on Aug. 1, 2018.

(51) Int. Cl.
*G06Q 40/00* (2023.01)
*G06N 3/04* (2023.01)
(Continued)

(52) U.S. Cl.
CPC ............... *G06N 3/04* (2013.01); *G06Q 40/08* (2013.01); *G07C 5/008* (2013.01); *G07C 5/12* (2013.01); *H04L 67/12* (2013.01); *H04W 4/44* (2018.02)

(58) Field of Classification Search
CPC .......... G06N 3/04; G06Q 40/08; G07C 5/008; G07C 5/12; H04L 67/12; H04W 4/44
See application file for complete search history.

(56) References Cited

U.S. PATENT DOCUMENTS

| 8,799,034 B1* | 8/2014 | Brandmaier | G07C 5/008 705/4 |
| 9,773,281 B1* | 9/2017 | Hanson | H04W 4/023 |

(Continued)

FOREIGN PATENT DOCUMENTS

| EP | 3239686 | 11/2017 |
| EP | 3578433 A1 | 4/2019 |

(Continued)

OTHER PUBLICATIONS

Shannon et al: "Applying crash data to injury claims—an investigation of determinant factors in severe motor vehicle accidents", Accident Analysis and Prevention 113 (2018) 244-256 (Year: 2018).*

(Continued)

*Primary Examiner* — Edward J Baird
(74) *Attorney, Agent, or Firm* — Lee & Hayes, P.C.

(57) ABSTRACT

A method of determining a claim value corresponding to a damaged vehicle of a customer includes receiving exception data and image(s) corresponding to the damaged vehicle, generating a set of image parameters by analyzing the one or more image corresponding to the damaged vehicle using a first trained artificial neural network, generating the claim value corresponding to the damaged vehicle by analyzing the set of image parameters and the exception data using a second trained artificial neural network, and transmitting the claim value corresponding to the damaged vehicle. The method may include respective training of the first artificial neural network and second artificial neural network using labeled images and labeled telematics data.

20 Claims, 5 Drawing Sheets

(51) Int. Cl.
*G06Q 40/08* (2012.01)
*G07C 5/00* (2006.01)
*G07C 5/12* (2006.01)
*H04L 67/12* (2022.01)
*H04W 4/44* (2018.01)

(56) References Cited

U.S. PATENT DOCUMENTS

| | | | |
|---|---|---|---|
| 9,830,748 B2 | 11/2017 | Rosenbaum | |
| 9,990,782 B2 | 6/2018 | Rosenbaum | |
| 10,269,190 B2 | 4/2019 | Rosenbaum | |
| 10,354,230 B1* | 7/2019 | Hanson | G07B 15/00 |
| 10,388,157 B1* | 8/2019 | Hayes | G08G 1/167 |
| 10,467,824 B2 | 11/2019 | Rosenbaum | |
| 10,657,647 B1* | 5/2020 | Chen | G06T 7/254 |
| 10,672,080 B1* | 6/2020 | Maurer | G06Q 20/34 |
| 10,937,103 B1* | 3/2021 | Marlow | G06Q 40/08 |
| 10,937,104 B1* | 3/2021 | Fiedler | G06Q 40/08 |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2013/0317865 A1* | 11/2013 | Tofte | G06Q 10/06 |
| | | | 705/4 |
| 2015/0039397 A1* | 2/2015 | Fuchs | G06Q 30/0283 |
| | | | 705/7.35 |
| 2016/0171599 A1* | 6/2016 | Bray | G06Q 30/08 |
| | | | 705/26.3 |
| 2017/0293894 A1* | 10/2017 | Taliwal | G06V 10/462 |
| 2018/0204394 A1* | 7/2018 | Dahl | G07C 5/0808 |
| 2018/0211122 A1* | 7/2018 | Amico | B60K 37/00 |
| 2018/0260793 A1* | 9/2018 | Li | G06N 3/084 |
| 2020/0294401 A1* | 9/2020 | Kerecsen | G07C 5/008 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | | | |
|---|---|---|---|---|
| EP | 3561779 A1 * | 10/2019 | | A61B 5/0077 |
| EP | 3730375 A1 | 4/2020 | | |
| EP | 3960576 A1 | 3/2022 | | |
| EP | 4190659 | 6/2023 | | |
| EP | 4190660 A1 | 6/2023 | | |

OTHER PUBLICATIONS

D S Dima, et al., Solutions for Acceleration Measurement in Vehicle Crash Tests, IOP Conf. Ser.: Mater. Sci. Eng. 252 012007, 2017.

McClafferty, K.J., et al., University of Western Ontario Accident Research Team, Event Data Recorders in TEH Analysis of Frontal Impacts, 51st Annual Proceedings, Association for the Advancement of Automotive Medicine, Oct. 15-17, 2007.

Palmer, Telematics in Auto Claims is Inevitable, CCC, Insurance, (http://www.cccis.com/category/insurance/), Perspectives (http://www.cccis.com/category/perspectives/), Aug. 18, 2016.

U.S. Appl. No. 15/277,200, William J. Leise, et al., System and Method for Predicting Total Loss of a Vehicle Prior To a Crash, filed Sep. 27, 2016.

U.S. Appl. No. 15/628,367, Christina P. Mullen, et al., Using Vehicle Data, Geographic Area Type Data, and Vehicle Collision Data in Determining an Indication of Whether a Vehicle in a Vehicle Collision is a Totoal Loss, filed Jun. 20, 2017.

U.S. Appl. No. 15/628,391, Christina P. Mullen, et al., Using Vehicle Data and Crash Force Data in Determining an Indication of Whether a Vehicle Collision is a Total Loss, filed Jun. 20, 2017.

U.S. Appl. No. 15/628,412, Christina P. Mullen, et al., Using Vehicle Collision Data in Determining an Indication of Whether a Vehicle in a Vehicle Collision is a Total Loss, filed Jun. 20, 2017.

U.S. Appl. No. 62/564,055, Gregory L. Hayward, et al., Real Property Monitoring Systems and Methods for Detecting Damage and Other Conditions, filed Sep. 27, 2017.

U.S. Appl. No. 62/580,655, Gregory L. Hayward, et al., Automobile Monitoring Systems and Methods for Detecting Damage and Other Conditions, filed Nov. 2, 2017.

U.S. Appl. No. 62/610,599, Gregory L. Hayward, et al., Automobile Monitoring Systems and Methods for Detecting Damage and Other Conditions, filed Dec. 27, 2017.

U.S. Appl. No. 62/621,218, Gregory L. Hayward, et al., Automobile Monitoring Systems and Methods for Loss Mitigation and Claims Handling, filed Jan. 24, 2018.

U.S. Appl. No. 62/621,797, Gregory L. Hayward, et al., Automobile Monitoring Systems and Methods for Loss Reserving and Financial Reporting, filed Jan. 25, 2018.

U.S. Appl. No. 62/580,713, Gregory L. Hayward, et al., Real Property Monitoring Systems and Methods for Detecting Damage and Other Conditions, filed Nov. 2, 2017.

U.S. Appl. No. 62/618,192, Gregory L. Hayward, et al., Real Property Monitoring Systems and Methods for Detecting Damage and Other Conditions, filed Jan. 17, 2018.

U.S. Appl. No. 62/625,140, Gregory L. Hayward, et al., Systems and Methods for Establishing Loss Reserves for Building/Real Property Insurance, filed Feb. 1, 2018.

U.S. Appl. No. 62/646,729, Gregory L. Hayward, et al., Real Property Monitoring Systems and Methods for Loss Mitigation and Claims Handling, filed Mar. 22, 2018.

U.S. Appl. No. 62/646,735, Gregory L. Hayward, et al., Real Property Monitoring Systems and Methods for Risk Determination, filed Mar. 22, 2018.

U.S. Appl. No. 62/646,740, Gregory L. Hayward, et al., Systems and Methods for Establishing Loss Reserves for Building/Real Property Insurance, filed Mar. 22, 2018.

U.S. Appl. No. 62/617,851, Gregory L. Hayward, et al., Implementing Machine Learning for Life and Health Insurance Pricing and Underwriting, filed Jan. 16, 2018.

U.S. Appl. No. 62/622,542, Gregory L. Hayward, et al., Implementing Machine Learning for Life and Health Insurance Loss Mitigation and Claims Handling, filed Jan. 26, 2018.

U.S. Appl. No. 62/632,884, Gregory L. Hayward, et al., Implementing Machine Learning for Life and Health Insurance Loss Reserving and Financial Reporting, filed Feb. 20, 2018.

U.S. Appl. No. 62/652,121, Gregory L. Hayward, et al., Implementing Machine Learning for Life and Health Insurance Claims Handling, filed Apr. 3, 2018.

* cited by examiner

VEHICLE DAMAGE CLAIMS SELF-SERVICE

CROSS-REFERENCE TO RELATED APPLICATION

The present application claims priority to U.S. Application No. 62/713,355, filed Aug. 1, 2018. The priority application is hereby incorporated by reference.

FIELD OF THE DISCLOSURE

The present disclosure generally relates to vehicle damage claims self-service techniques, and more specifically, to techniques for training and using machine learning models to determine vehicle damage claim amounts/values based on vehicle telematics data and image data.

BACKGROUND

Claim valuation is a technique that is performed continuously by human insurance claim analysts and actuaries, who must view and inspect vehicle damage to assess the extent of damage, and who rely on their past experience and judgment to evaluate losses. The prior art includes attempts to quantify damage to vehicles via image analysis, and attempts to quantify damage to vehicles via analysis of telematics (e.g., "black box"/vehicle event data recorder (EDR) data). No known method analyzes both images and telematics data, and the current human-based and computer-based claim valuation models are not ideal. Human judgment is subject to bias, distraction, fatigue and other factors. Existing computerized valuation models may be limited to determining whether damage to a vehicle represents a total loss or not. The amount and/or extent of damage to a vehicle may not be perceptible until the damaged vehicle is disassembled partially or fully. This imperceptibility is a technical problem due to the fact that modern vehicles comprise layered material (e.g., plastic, rubber, etc.) that may obscure interior damage. Therefore, quantifying damage via images alone may be flawed. Similarly, telematics alone may not work. For example, electrical failure at or prior to a collision may result in partial or full telematics data loss. Using images or telematics in isolation leads to inaccurate vehicle damage valuations. In summary, claim valuations are lacking in uniformity, consistency, and repeatability. Faster, more efficient, more accurate, and less expensive methods and systems, which analyze both vehicle telematics data and image data to determine claim valuations, are needed.

BRIEF SUMMARY

The present disclosure generally relates to vehicle damage claims self-service techniques. Embodiments of exemplary systems and computer-implemented methods are summarized below. The methods and systems summarized below may include additional, fewer, or alternate components, functionality, and/or actions, including those discussed elsewhere herein.

In one aspect, a computer-implemented method of determining a claim value corresponding to a damaged vehicle includes receiving exception data corresponding to the damaged vehicle, receiving one or more image corresponding to the damaged vehicle, generating a set of image parameters by analyzing the one or more image corresponding to the damaged vehicle using a first trained artificial neural network, generating the claim value corresponding to the damaged vehicle by analyzing the set of image parameters and the exception data using a second trained artificial neural network, and transmitting the claim value.

In another aspect, a computing system comprising one or more processors and one or more memories storing instructions is provided. When the instructions are executed by the one or more processors, the instructions cause the computing system to receive one or more image corresponding to a damaged vehicle and exception data corresponding to the damaged vehicle. The instructions may further cause the computing system to generate a set of image parameters by analyzing the one or more image using a first trained artificial neural network, to generate a claim value by analyzing the set of image parameters and the exception data using a second trained artificial neural network, and to transmit the claim value.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
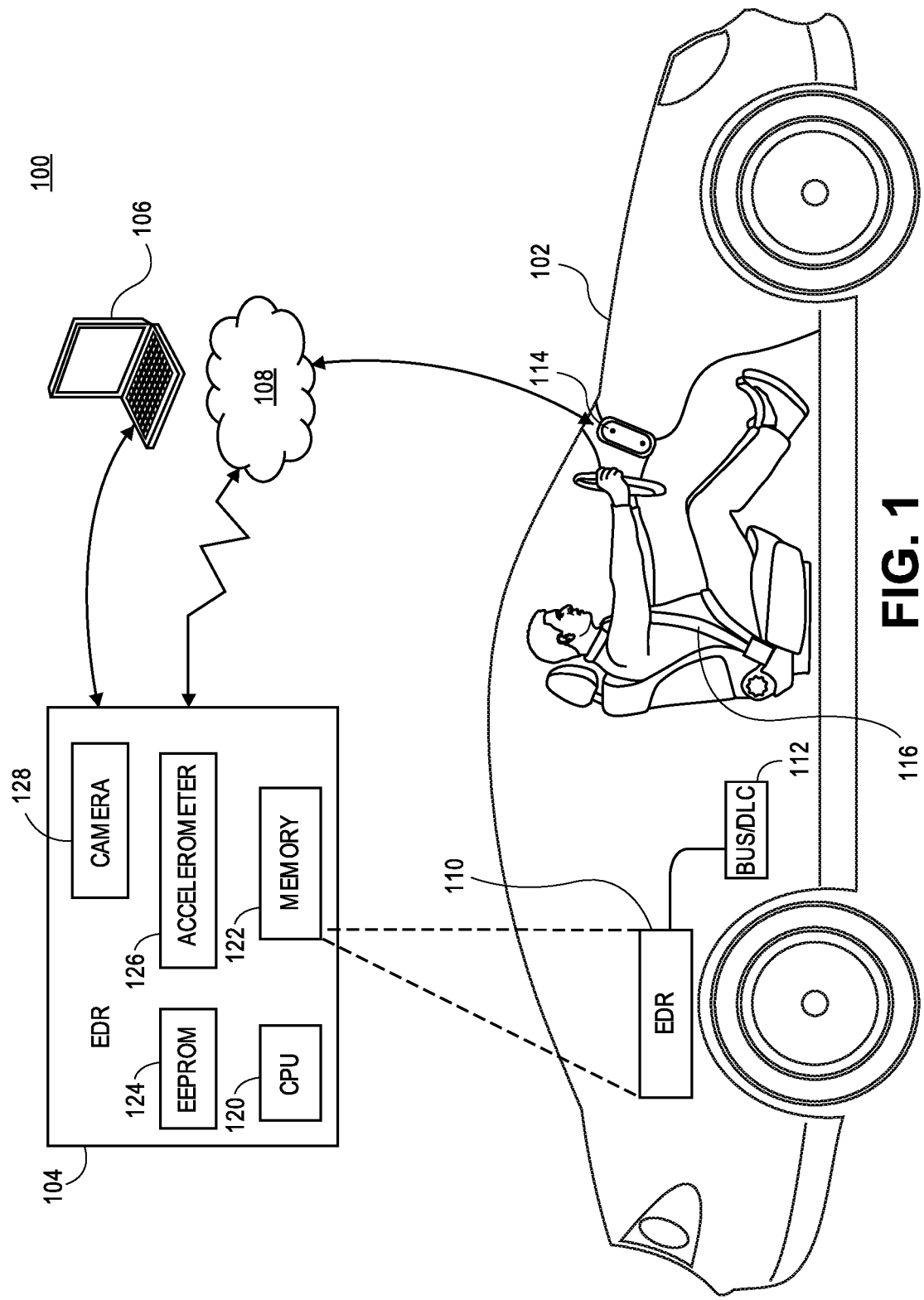
FIG. 1 depicts a vehicle telematics environment including the collection of vehicle telematics data, according to an embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The embodiments described herein relate to, inter alia, providing methods and systems for providing vehicle damage claims self-service for customers (e.g., users of applications, policy holders, etc.). More specifically, in some embodiments, machine learning (ML) techniques may be used to train one or more ML models to determine a damage value of a claim by analyzing a plurality of training parameters and/or data. The training parameters and/or data may include telematics data. The telematics data may be collected from one or more device (e.g., an EDR, a mobile device of vehicle operator/occupant, and/or an after-market device). Telematics data may include information relating to time periods before, during, and after vehicle damage events including crashes, impacts, and/or accidents. For example, speed, location, braking, steering, airbag deployment data may be collected. The data may be collected continuously and/or sampled at an interval (e.g., one millisecond or less). Crash pulses may be collected which include delta-V, also known as change in forward velocity. Delta-V may be collected in lateral and forward dimensions. An image may be collected via a digital camera such as a camera of a mobile device (e.g., a smartphone). The image may be analyzed using a trained artificial neural network to determine one or more image parameters. The one or more image parameters may be provided as input to a second trained artificial neural network along with telematics data. The second artificial neural network may output a value indicative of a dollar value of an insurance claim. However, as noted above, telematics data may be incomplete. There may be a time lag between impact and the triggering of recording. A severe crash may cause an electrical power loss which can cause data loss and/or incomplete recording of impact data. In crashes having multiple impacts, data of one impact may affect the recording of data relating to the other impacts. Therefore, supplementing telematics data with image data relating to the damaged vehicle may improve the ability of predictive models to determine the severity of loss and the value of claims relating to the repair and/or replacement of the vehicle.

In one embodiment, a hardware device may be provided to drivers. The device may be similar to State Farm® Drive Safe & Save™ app. The device may include instructions which, when executed, cause telematics data to be collected, stored, and/or transmitted to an analysis system. The device may include instructions for encrypting and/or decrypting telematics data, to maintain the privacy of customers. The device may record speed and g-forces, which may include delta-V. When an impact is detected, the device may cause the recorded information to a remote system for analysis by one or more ML model. A user may also take photographs of the damaged vehicle using a device (e.g., a mobile device). The photograph may be analyzed by the model. The model may then predict an amount and/or type of damage. Unlike prior art methods and systems, the present invention fuses physical knowledge regarding the impact obtained from sensors in the vehicle as well as optical image data. The speed, angle of impact, intensity of impact, and images of the vehicle damaged in the impact allow for automated claims decisions that are fairer, faster, and which may result in significant cost savings for customers.

In some embodiments the transmission of telematics data may occur only after vehicle damage (e.g., an accident) has occurred. After the accident, the policy holder may use a mobile application to upload photos of the damaged covered vehicle. The telematics and image data may be used as input to a series of models. For example, a convolutional neural network (CNN) may process the image data while an ensemble-based estimator may analyze the telematics data. The result of the series of models may be a damage estimate for the insured vehicle.

I. Exemplary Telematics Data and Image Data Machine Learning Operation Environment FIG. 1 depicts a vehicle telematics environment 100 including the collection of vehicle telematics data, according to an embodiment. The environment 100 may include a vehicle 102, an EDR 104, a diagnostic device 106, and a computer network 108. The vehicle 102 may include a data link connector (DLC) 112 and a mobile device 114 of a vehicle operator 116. The vehicle 102 depicted is an automobile, but in some embodiments may be another vehicle (e.g., a motorcycle, semi-trailer truck, boat, etc.). The EDR 104 may include a CPU 120, a memory 122, an EEPROM 124, an accelerometer 126, and a camera 128. Other sensors (e.g., a thermometer) may be included, in some embodiments. The CPU 120 may include any suitable number of processors, cores, and/or graphics processing units (GPUs). The CPU 120 may execute instructions included in the memory 122. The instructions may cause data from sensors such as the accelerometer 126 and/or the camera 128 (i.e., telematics data) to be stored in the EEPROM 124. The memory 122 and the EEPROM 124 may include one or more persistent memories (e.g., a hard drive and/or solid state memory). The data may be pushed from the EDR 104 to the diagnostic device 106, or pulled to the diagnostic device 106 from the EDR 104.

The diagnostic device 106 may be any suitable computing device (e.g., a mobile phone, tablet, phablet, laptop, server, etc.) and may include instructions for reading, decrypting, and/or interpreting the telematics data stored in the EEPROM 124 of the EDR 104. In some embodiments, the diagnostic device 106 may be communicatively coupled with the EDR 104 via the network 108. The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may comprise any type or types of suitable network(s). The DLC 112 may be a multi-pin diagnostic connection port in a vehicle. The DLC may allow a diagnostic device (e.g., the diagnostic device 106) to access data stored in the EDR, and/or to store data in the EDR. In some cases, third-party devices may be coupled to the DLC, wherein the third party devices include instructions for reading data from and writing data to the EDR.

The mobile device 114 may be a portable device of the user (e.g., a smart phone). The mobile device 114 may include an application capable of continuously and/or periodically reading data from the EDR 104. The mobile device may also collect data from the DLC 112 and/or from the EDR 104. The mobile device 114 may be communicatively coupled to the network 108 and may transmit data received from the EDR 104 and/or DLC to other devices (e.g., the diagnostic device 106, a remote server, etc.). In some embodiments, all of the data collected/processed relating to the vehicle may be collected by the EDR 104. In other embodiments, the EDR 104 may not be present and all data collected/processed may be collected by the mobile device 114. In some embodiments, the vehicle operator 116 may be a mere occupant and not an operator. For example, in autonomous vehicles, the operator 116 may be an inactive participant and/or not present.

It should be appreciated that the application in the mobile device 114 may be capable of performing additional functions, in some embodiments. For example, the mobile device 114 may include instructions for looking up information about an authenticated user of the mobile device 114 (e.g., vehicle operator 116, an occupant/passenger of vehicle 102, etc.). To continue the example, the mobile device 114 may include additional instructions for determining, based on the information about the authenticated user of the mobile device 114, whether the authenticated user is associated with one or more automobile insurance policies. If so, the application may retrieve/receive policy information (e.g., via the mobile device 114 and/or a remote computing device). The application may use the policy information to determine whether the vehicle 102 is a covered vehicle under one or more policy. The application may also prompt the authenticated user to enter information identifying one or more insurance policy under which the vehicle 102 is covered.

Figure 2:
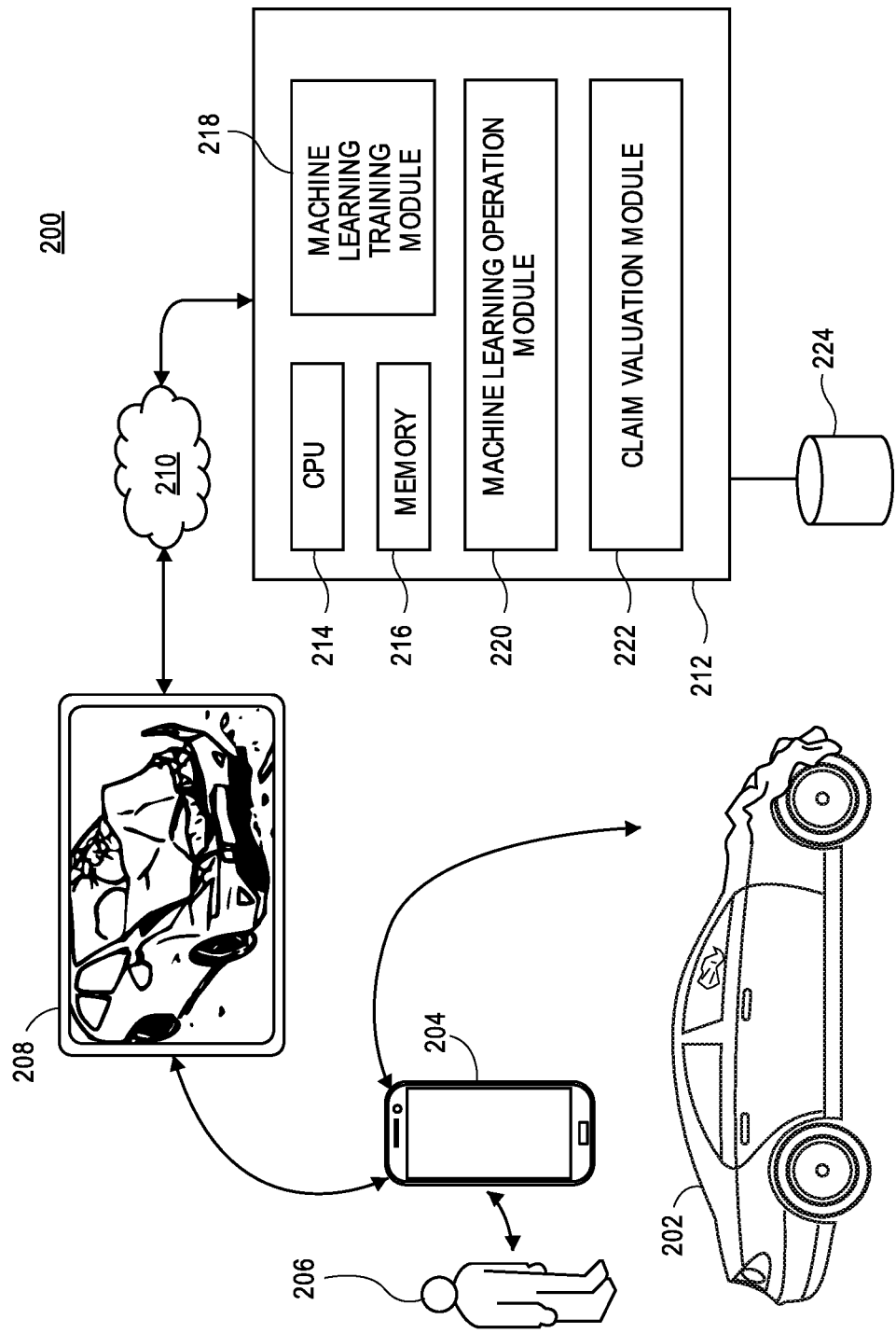
FIG. 2 depicts a vehicle telematics and image data collection and processing environment, according to an embodiment.

FIG. 2 depicts a vehicle telematics and image data collection and processing environment 200, according to an embodiment. The environment 200 may include a damaged vehicle 202, a mobile device 204 of a customer 206, an image 208, a computing network 210, and a remote computing device 212. The damaged vehicle 202 may correspond to the vehicle 102 of FIG. 1. The mobile device 204 may relate to the mobile device 114 of FIG. 1. The customer 206 may correspond to the vehicle operator 116, or may be another party. In some cases, the customer 206 may be an agent or assignee of the real-party-in-interest, claimant, and/or policy-holder. The network 210 may be a single communication network, or may include multiple communication networks of one more types (e.g., one or more wired and/or wireless LANs, and/or one or more wired and/or wireless WANs such as the Internet). The image 208 may be any digital image data, including still images and/or video data (e.g., MPEG-4 data). The image 208 may be generated by mobile device 204 (e.g., via a camera integral to mobile device 204). The image 208 may be transmitted via mobile device 204 and the computing network 210 to the remote server 212. The transmission may be initiated by an application including instructions executing in the mobile device 204.

The remote computing device 212 may include a CPU 214, a memory 216, a machine learning training module 218, a machine learning operation module 220, a claim valuation module 222, and an electronic database 224 that is communicatively linked to the remote computing device 212. Generally, the CPU 214 may be configured to execute software instructions stored in the memory 216. The instructions may, when executed, cause the machine learning training module 218 to read data and train ML models. The trained ML models may be stored in the memory 216, for example. The instructions may, when executed, cause machine learning operation module to load, initialize, execute, and/or operate existing (i.e., trained ML models). The claim valuation module 222 may interpret the output of ML models executing in machine learning operation module 220 to generate a value corresponding to the value of a claim.

In operation, after the occurrence of an impact event (e.g., a crash, accident, etc.) resulting in the damaged vehicle 202, the customer 206 may open an application in the mobile computing device 204. The application may be available to the public in an application store, and the customer 206 may be required to authenticate (e.g., to login) using credentials obtained from the proprietor of the methods and systems herein. The customer 206 may have the option of submitting an insurance claim relating to the damaged vehicle 202 via the application. The application may prompt the customer 206 to enter information relating to the damaged vehicle 202. For example, the customer 206 may be prompted to select the cause of the damage from a pre-filled list (e.g., accident, weather, vandalism, etc.). One of the pieces of information that the customer may be invited/required to provide is an image 208 depicting the damage to the vehicle. Once the customer 206 has entered the information the application requires, the user may submit the information via the network 210 to the remote computing device 212.

Communication between the application and remote computing device 212 may be implemented using any suitable programming language, technology stack, and/or framework. For example, a client-server web development framework may be used to implement a web site, mobile application (e.g., an Android application package, etc.), and/or set of server-side processing scripts/programs. The server-side components may execute in an application server. In some embodiments, a front-end web application framework (e.g., a JavaScript web framework) may implement some or all of the server-side components. Once the remote computing device 212 receives the information submitted by the customer 206, the remote computing device may invoke a trained ML model in ML operation module 220. That is, by the time a user submits a self-service request for information relating to vehicle damage, remote computing device 212 may have already trained one or more ML model. A first ML model may be provided with the image 208 as input, and may output a set of image parameters. As stated above, telematics data may also be received via the network 210. The set of image parameters and the telematics data may be provided as input to a second ML model executing in ML operation module 222. The second ML model may be configured to output a claim valuation prediction, which may be analyzed by claim valuation module 222 to determine a precise value corresponding to the damage to the vehicle 202.

It should be appreciated that, like the application in the mobile device 114 of FIG. 1, the application in the mobile device 204 may be capable of performing additional functions, in some embodiments. For example, mobile device 204 may include instructions for looking up information about an authenticated user of the mobile device 204 (e.g., the customer 206 and/or an occupant/passenger of damaged vehicle 202, etc.). To continue the example, the mobile device 204 may include additional instructions for determining whether the authenticated user is associated with one or more automobile insurance policies. If so, the application may retrieve/receive policy information and may use the policy information to determine whether the damaged vehicle 202 is a covered vehicle under one or more policy. The application may also prompt the authenticated user to enter information identifying one or more insurance policy under which the damaged vehicle 202 is covered.

Figure 3A:
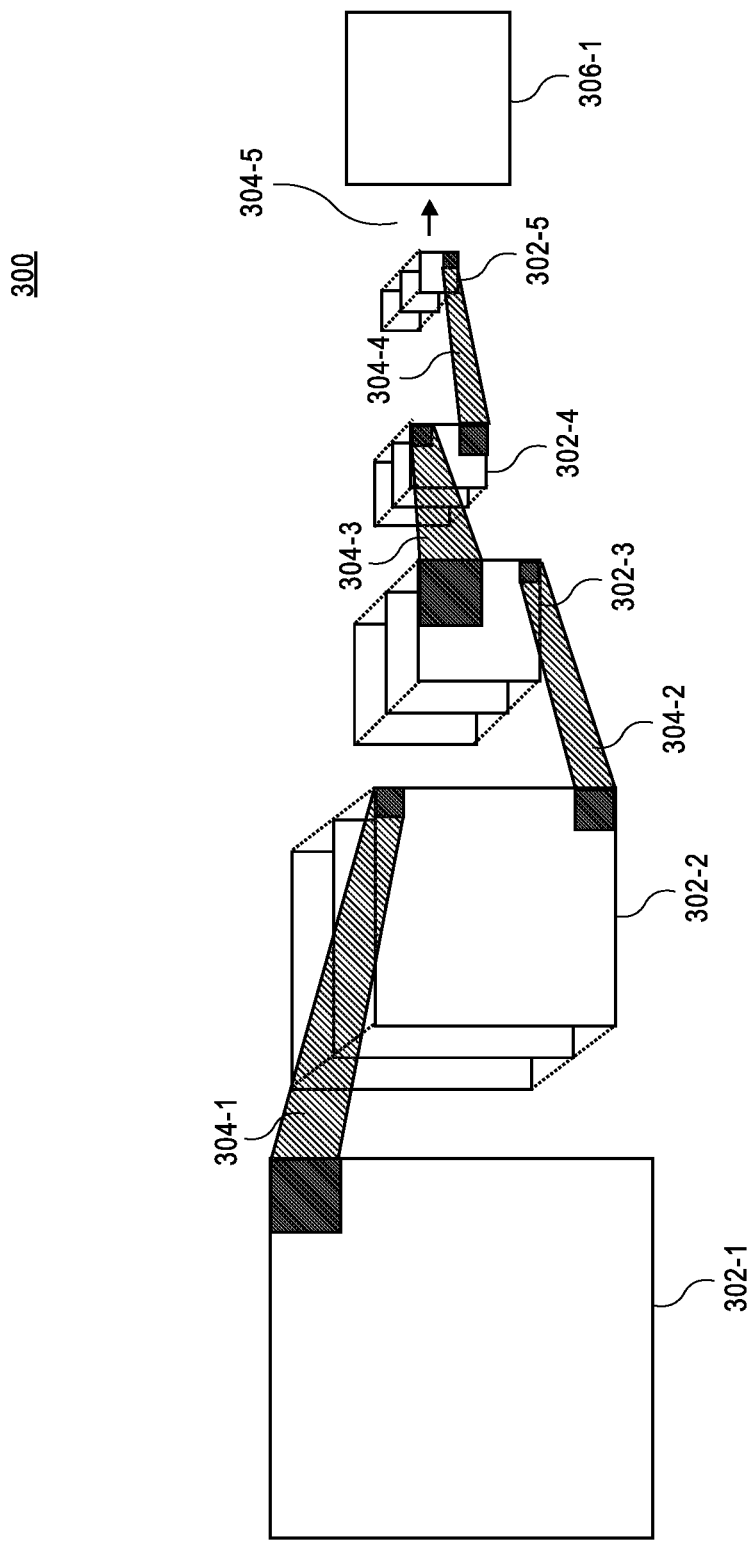
FIG. 3A depicts an image data processing artificial neural network, according to one embodiment and scenario.
Figure 3B:
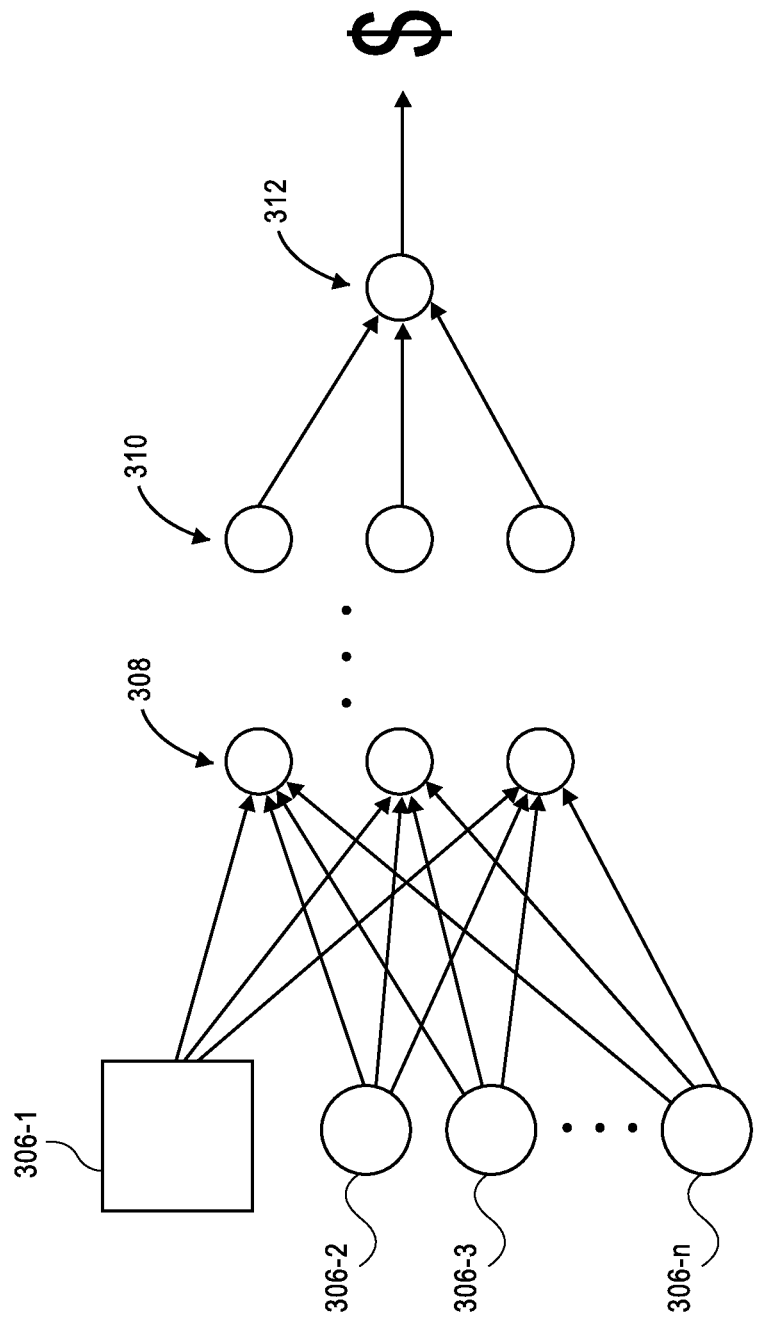
FIG. 3B depicts an image data and telematics data processing artificial neural network, according to an embodiment.

II. Exemplary Telematics Data and Image Data Machine Learning Training Environment FIG. 3A and FIG. 3B depict a data processing artificial neural network (ANN) 300, according to one embodiment and scenario. The ANN 300 may include a convolutional neural network (CNN). In some cases, ANN 300 may include both a CNN and an ANN. In another embodiment, an ANN and a CNN may be chained or linked together. A CNN and ANN comprising environment 300 may execute on one or more computing devices, including in a mobile device (e.g., in mobile computing device 204).

The CNN depicted in FIG. 3A may include an image 302-1 which may correspond to the image 208. The input image 302-1 may be an image having a pixel dimension (e.g., 1024×1024 pixels), and may be represented as a three-dimensional tensor including raw pixels of the image and three color channels (Red, Green, and Blue). Of course the image may also be of any suitable pixel dimension, larger or smaller, and may have more or fewer channels. In some embodiments, frames of images (i.e., video data) may be analyzed by the CNN depicted in FIG. 3A. The image 302-1 may be analyzed by a first convolution operation 304-1 which scans the input layer using a filter to produce a stack of activation, or feature, maps 302-2 wherein one activation layer in the "stack" is created for each filter. The filter may downsample the input image during the scanning. A second convolution operation 304-2 may produce a second feature map 302-3, and a third convolution operation 304-3 and fourth convolution operation 304-4 may produce a feature map 302-4 and 302-5, respectively. Any suitable number of convolution operations may be used. Finally, a fully-connected layer 304-5 may produce an output 306-1. It will be appreciated that more than one network architecture and/or set of scaffolding steps may exist for transforming the image 302-1. For example, convolution operation 304-1 may include hyperparameters (e.g., filters, filter spatial extent, stride, padding, etc.) that may be tuned. The output 306-1 may include a continuous number representing the CNN's prediction of a preliminary claim value (i.e., the claim value as determined by only the CNN's analysis of image data), or a set of labels. The output 306-1 may be included as an input parameter to the ANN depicted in FIG. 3B.

The ANN depicted in FIG. 3B may include an input layer comprising output 306-1 of the CNN, and additional telematics input nodes 306-2, 306-3, through 306-$n$, wherein n is any positive integer. That is, the ANN may include any number of input nodes. The ANN may include any number of hidden layers (e.g., hidden layer 308 through hidden layer 310), and each hidden layer may have any number of neurons. The nodes, or neurons, comprising hidden layer 308 may each respectively pass output as an input parameter to each of the nodes comprising hidden layer 310. Any number of nodes/neurons may comprise hidden layers 308 and 310, and as such, the number of connections between the respective nodes may vary. The ANN may include output node 312, which may predict a dollar amount based on the inputs 306-1 through 306-$n$. The ANN depicted in FIG. 3B may be a deep neural network.

In general, training ML models may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

Training the CNN in FIG. 3A and the ANN in FIG. 3B may be performed using similar means. For example, labeled data may be used to train the CNN by using annotated training data comprising a set of images labeled using a dollar amount. A computing device, such as remote computing device 212, may include instructions for retrieving a set of images, wherein each image in the set of images is associated with a claim settlement amount (i.e., a label). The ML training module 218 of FIG. 2 may then analyze a subset of data to determine a validation set and a test set. The CNN may be iteratively trained using randomized initial conditions, until it learns to accurately predict a dollar value of a claim based on an input image of a damaged vehicle that the CNN has never "seen" before. In some embodiments, pooling layers may be added between successive convolution layers 304-1, 304-2, etc. Pooling layers, which may include spatial extent and stride hyperparameters, may reduce the representational size of each successive layer, as well as preventing overfitting.

The ANN depicted in FIG. 3B may be a regression model (e.g., a random forest regressor, gradient boost machine regression engine, and/or support vector machine), and may be trained by analyzing a set of impact data from past accidents, wherein the impact data includes information corresponding to the telematics data (e.g., speed, angle of impact, delta-V, etc.). Both the set of impact telematics data used to train the ANN and the set of images used to train the CNN may be retrieved by the ML training module 218 from the electronic database 224. The set of impact telematics data used to train the ANN may be a set of time series data, wherein each time series in the set corresponds to a time series from a set period (e.g., 100 ms) prior to an impact, to the same set period after the impact. In this way, the ANN may be trained using a set of time series, wherein each time series represents a set of telematics corresponding to a crash. For example, a first time series T1 may represent a first crash, a second time series T2 may represent a second crash, and so on. Each time series may be associated with a dollar amount representative of the value of an insurance claim relating to the impact corresponding to the time series. In this way, the ANN may be trained to accurately predict a dollar amount of a claim based on an input time series that the ANN has never "seen" before. The input 306-1 may be a dollar amount predicted by the CNN. The dollar amount predicted by the CNN may be provide in addition to the telematics data to the ANN, for a total of N telematics+1 input parameters. In this way, the output of the CNN may be a feature input to a regression model of the ANN. The output of the CNN may include a continuous number (e.g., a dollar value or severity score) and/or a discrete output (e.g., a number representing a category or classification). In an embodiment, a regression layer may be added to the output layer of the CNN. In the process of training the ANN, the ANN learns to appropriately weight the CNN data.

Although a preferred embodiment may include a daisy-chained set of ML models, wherein the output of one ML model is provided as input to a successive ML model; in some embodiments, a voting classifier/regression structure may be used, wherein a plurality of models determine independent predictions, and the independent predictions are averaged, compared, or weighted in a voting scheme. In some embodiments, a CNN and an ANN may be used, but may be separated (e.g., may run on different computing devices). For example, the CNN and ANN may both be trained in a server, but one or both may be executed in a mobile device of a user. In some embodiments, different models may be used for different purposes. For example, evaluating the claim value of claims involving certain classes of vehicles (e.g., rare cars, late model cars, etc.) may require the training, selection, and use of multiple trained models for those respective classes. The model used for analyzing the customer's claim may be selected based on answers that the customer 206 provides via the mobile device 204.

Training the CNN and ANN ML models may include assembling a pipeline of different regressors, wherein each regressor uses various different parameters, to determine which regressor provides the most accurate outcome. Each model may be operated, programmatically, with different combinations of hyperparameters (e.g., all possible hyperparameters in a search space). Eventually, the performance of the multiple regressors/models may be compared to identify best-performing model, and a copy of the tuned hyperparameters for that model may be identified, persisted, and/or further tuned (e.g., by manual investigation/experimentation). The ML models trained in the embodiments discussed herein may be trained using large volumes of data. For example, several years of telematics data obtained from customer devices may be used. The data may be on the order of one petabyte or larger. In some embodiments, customers may be incentivized to consent to allow the continuous and/or periodic collection of such data from a mobile device and/or a vehicle interface. In some areas, regulators may require the collection of some telematics data by automobiles. As such, a minimum amount of data may already be present in some vehicles without customer opt-in, while accessing the data may require opt-in/consent. Once a model is trained, a customer may be able to receive an instantaneous or near-instantaneous claim result. In such cases, the customer may first be required to consent to having their claim processed by the trained ML model. Once a dollar amount of the claim is determined, the value may be provided to the customer to replace/repair the damaged vehicle, for total loss detection, and/or provided to another business process. Value may be provided to customers via any suitable means, including via paper check, electronic transfer of any currency, etc. Ultimate determinations of claim coverage and settlement may be governed by customers' insurance policy.

Figure 4:
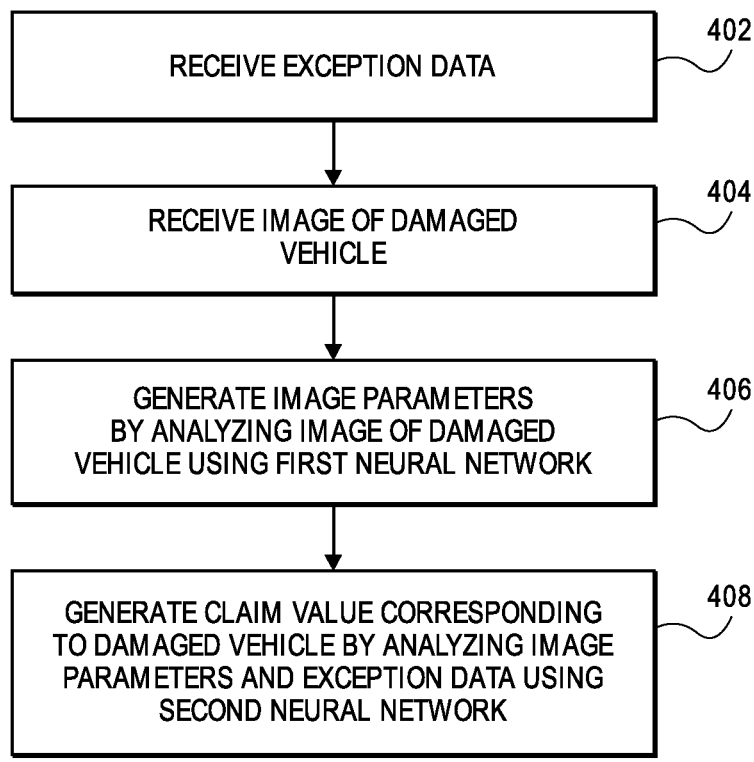
FIG. 4 depicts a method of generating claim value corresponding to a damaged vehicle by analyzing image parameters and exception data using a plurality of neural networks.

III. Exemplary Telematics Data and Image Data Analysis Using Trained Machine Learning Models FIG. 4 depicts and exemplary method 400 for using machine learning models to determine vehicle damage claim amounts/values based on vehicle telematics data and image data. The method 400 may include receiving exception data (block 402). Herein, exception data may also be referred to as "telematics data" and may include any digital data indicative of a vehicle's speed, trajectory, angle, motion, acceleration, braking, steering, etc. both pre-impact, during impact, and post-impact. The exception data may be received from an EDR and/or a mobile device (e.g., a smartphone of a vehicle occupant and/or operator). The exception data may be encrypted, as noted above, and may be encoded in any suitable data format (e.g., a string format, a binary format, etc.). The exception data and/or image data may be compressed, and may be encoded in proprietary and/or original equipment manufacturer (OEM) data format. The exception data and/or image data may be transmitted/received as a file and/or a stream of bits. The data may be received in a remote computing device (e.g., the remote computing device 212 of FIG. 2) and/or a mobile device of a vehicle operator (e.g., the mobile device 204 of the customer 206 of FIG. 2, and/or the mobile device 114 of the vehicle operator 114 of FIG. 1). In some embodiments, exception data from a mobile device and a stationary or semi-stationary vehicle-based device such as an EDR may be received. Data from these multiple sources may be aligned, correlated, joined, and/or merged to form a combined data set that may be analyzed by a trained ANN as described in accordance with the methods and systems described above.

The method 400 may further include receiving an image of a damaged vehicle (block 404). The damaged vehicle may have been damaged by any circumstance, including all forms of unintentional damage (e.g., a "fender-bender," storm damage, serious accident, etc.) and intentional damage (e.g., vandalism). The exception data and/or image data may be transmitted to a remote computing system for processing, and/or may be received in a mobile device of a user where it is processed in situ. In such embodiments, the trained ML models discussed above may be distributed to the mobile computing device of the user. For example, the application discussed in conjunction with FIG. 2 may include instructions for retrieving one or more trained model from remote computing device 212, and for executing the models using the exception data and the capture image(s). Advantages to executing the trained ML models in the mobile computing device of the customer include lower latencies. In the case of video image data, the latencies may be significantly reduced (e.g., from seconds to microseconds). Additionally, by processing the data in a customer's mobile computing device, and not transferring the data to a server owned/controlled by the proprietor of the methods and systems described herein, the proprietor may avoid receiving and/or retaining private data of the customer that the proprietor does not strictly need access to in order to provide useful services via the methods and systems. The proprietor may also be able to gracefully offload CPU cycles and bandwidth, and may avoid network bottlenecks.

The method 400 may further include generating one or more image parameter by analyzing one or more image of a damaged vehicle using a first ANN (block 406). As noted, the first ANN may be a convolutional neural network (CNN) as discussed with respect to FIG. 3A and FIG. 3B. The image parameters may be raw output of the CNN, a continuous value (e.g., a predicted claim value amount expressed as a currency value), and/or a discrete value (e.g., a value representing whether images corresponding to a damaged vehicle represent a low, medium, or high level of damage). Alternatively, in some embodiments, the image parameter may be a Boolean value indicating a total loss (e.g., TOTAL-LOSS, NOT-TOTAL-LOSS). Machine learning models allow for a good deal of flexibility, and the information output by the CNN representing the image parameters may be expressed in many different ways, depending on the chosen embodiment.

Next, the method 400 may include generating a claim value corresponding to the damaged vehicle by analyzing the image parameters and exception data using a second ANN, and transmitting the claim value to a computing device (block 408). The second ANN may accept a set of inputs, wherein the output of the CNN is one of the inputs. The remaining inputs may include telematics data as discussed above (e.g., speed, angle of impact, delta-V, etc.), and may also include other information that may prove dispositive of claim value during training and experimentation. For example, in some embodiments, demographic information relating to the customer may be used to train the second ANN. As noted above, the ability of the method 400 and other methods and systems disclosed herein to train separate and complementary models for the analysis of both telematics data and image-based data overcomes technical problems inherent to using one or the other, but not both, sources of data. An approach relying on only visually apparent information about a vehicle lacks information about the physical circumstances of an impact, in the same way that an approach relying only on the physical circumstances of an impact may be flawed. As discussed, telematics data and/or sensor data may be inaccurate, having been damaged or disrupted due to an impact.

The claim value(s) determined by the trained models may be used in any suitable way, including for claim settlement purposes. For example, in the embodiment discussed above wherein one or both of the trained ML models are executing in the mobile device of the customer, the claim value may be displayed to the customer via an application executing in the mobile device. The application may include instructions which when executed prompt the customer to accept the claim value as a final binding settlement of an insurance claim relating to the damaged vehicle. In this way, the methods and systems depicted herein may be used to enable a fully-automated claim reporting, processing, and settlement procedure without any human input from the perspective of the insurer-proprietor. Over time, such automated methods and systems may result in significant cost savings.

ADDITIONAL CONSIDERATIONS

With the foregoing, an insurance customer may opt-in to a rewards, insurance discount, or other type of program. After the insurance customer provides the customer's affirmative consent, an insurance provider remote server may collect data from the customer's mobile device, smart vehicle controller, or other smart devices—such as with the customer's permission or affirmative consent. The data collected may be related to certain functionalities or profiles, and/or insured assets before (and/or after) an insurance-related event, including those events discussed elsewhere herein. In return, risk averse insureds, vehicle owners, home owners, or home or apartment occupants may receive discounts or insurance cost savings related to home, renters, personal articles, auto, and other types of insurance from the insurance provider.

In one aspect, smart or autonomous vehicle data, smart or interconnected home data, mobile device data, social media data, and/or other data, including the types of data discussed elsewhere herein, may be collected or received by an insurance provider remote server, such as via direct or indirect wireless communication or data transmission from a smart or autonomous vehicle, mobile device, smart home controller, other customer computing device, or customer social media content after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, personal belongings, or homes, and/or (ii) vehicle, home or apartment occupants.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, the word "set", unless expressly defined otherwise, is hereby defined to mean a set having one or more elements, but not the empty set.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for the systems and methods described herein, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method comprising:
   receiving, via a processor, one or more images illustrating damage to a damaged vehicle, the damage being caused by an impact;
   receiving, via the processor, first exception data corresponding to the damaged vehicle from a mobile device of a customer;
   receiving, via the processor, second exception data corresponding to the damaged vehicle from an electronic data recorder of the damaged vehicle;
   inputting, via the processor, the one or more images to a first machine learning model;
   determining, via the processor and using the first machine learning model, a first claim value associated with the damaged vehicle and based at least in part on the one or more images, wherein the first machine learning model is trained to determine the first claim value based on a set of images illustrating past damaged vehicles and corresponding repair costs of the past damaged vehicles, respectively;
   generating, via the processor, combined exception data based on the first exception data and the second exception data, the combined exception data being indicative of the impact and including:
      movements of the damaged vehicle during a time period associated with the impact,
      an angle of the impact, and
      an intensity of the impact;
   inputting, via the processor, the first claim value and the combined exception data to a second machine learning model, wherein the second machine learning model is trained to determine the second claim value based on the first claim value generated by the first machine learning model and a set of past exception data;
   determining, via the processor and using the second machine learning model, a second claim value associated with the damaged vehicle based at least in part on the first claim value and the combined exception data; and
   transmitting, via the processor, the second claim value to a mobile computing device.

2. The computer-implemented method of claim 1, wherein the one or more images corresponding to the damaged vehicle include video data.

3. The computer-implemented method of claim 1, wherein the computer-implemented method further comprises:
   analyzing the one or more images corresponding to the damaged vehicle using at least one convolutional neural network and the first machine learning model.

4. The computer-implemented method of claim 1, further comprising:
   generating a continuous value representing the first claim value.

5. The computer-implemented method of claim 1, wherein transmitting the second claim value to a mobile computing device includes displaying the second claim value in the mobile computing device.

6. The computer-implemented method of claim 1, wherein the first claim value includes a Boolean indicating a recommendation as to whether the damaged vehicle is a total loss.

7. The computer-implemented method of claim 1, wherein the second exception data further includes a speed, an acceleration, braking, and steering of the damaged vehicle before, during, and after the impact.

8. The computer-implemented method of claim 4, wherein the first claim value includes a discrete value indicating a level of damage for the damaged vehicle.

9. The computer-implemented method of claim 1, wherein determining the second claim value is further based on the movements of the damaged vehicle during the time period associated with the impact, the angle of the impact, and the intensity of the impact.

10. A computing system comprising:
    one or more processor, and
    one or more memories storing instructions that, when executed by the one or more processors, cause the one or more processors to:
       receive one or more images illustrating damage to a damaged vehicle from one or more sensors carried by the vehicle, the damage being caused by an impact,
       receive first exception data corresponding to the damaged vehicle from a mobile device of a customer,
       receive second exception data corresponding to the damaged vehicle from an electronic data recorder of the damaged vehicle,
       input the one or more images to a first machine learning model,
       determine a first claim value associated with the damaged vehicle using the first machine learning model and based at least in part on the one or more images, wherein the first machine learning model is trained to determine the first claim value using a set of images illustrating past damaged vehicles and dollar amounts corresponding to repair costs of the past damaged vehicles, respectively,
       generate combined exception data based on the first exception data and the second exception data, the combined exception data being indicative of the impact and including:
          movements of the damaged vehicle during a time period associated with the impact,
          an angle of the impact, and
          an intensity of the impact,
       input the first claim value and the combined exception data to a second machine learning model, wherein the second machine learning model is trained to determine the second claim value based on the first claim value generated by the first machine learning model and a set of past exception data,
       determine a second claim value associated with the damaged vehicle using the second machine learning model based at least in part on the first claim value and the combined exception data, and
       transmit the second claim value to a mobile computing device.

11. The computing system of claim 10, wherein the instructions further cause the one or more processor to:

receive video data corresponding to the damaged vehicle, and analyze the video data using the first machine learning model.

12. The computing system of claim 10, wherein the instructions further cause the one or more processor to:

analyze the one or more images corresponding to the damaged vehicle using at least one convolutional neural network and the first machine learning model.

13. The computing system of claim 10, wherein the instructions further cause the one or more processor to:

generate a continuous value representing the first claim value.

14. The computing system of claim 10, wherein the instructions further cause the one or more processor to:

cause the second claim value to be displayed by the mobile computing device.

15. The computing system of claim 13, wherein the instructions further cause the one or more processor to:

generate a Boolean value indicating recommendation as to whether the damaged vehicle is a total loss.

16. The computing system of claim 10 wherein the set of past exception data is generated by a respective sensor carried by each of the past damaged vehicles.

17. The computing system of claim 10, wherein the second exception data further includes a speed, an acceleration, braking, and steering of the damaged vehicle before, during, and after the impact.

18. The computing system of claim 13, wherein the first claim value includes a discrete value indicating a level of damage for the damaged vehicle.

19. A non-transitory computer readable medium containing program instructions that when executed, cause a computer to:

receive first exception data corresponding to a damaged vehicle from a mobile computing device of a customer, receive second exception data corresponding to the damaged vehicle from an electronic data recorder of the damaged vehicle, obtain one or more images illustrating damage to the damaged vehicle via a camera of the mobile computing device, the damage being caused by an impact, input the one or more images to a first machine learning model, determine a first claim value associated with the damaged vehicle using the first machine learning model and based at least in part on the one or more images, wherein the first machine learning model is trained to determine the first claim value using a set of images illustrating past damaged vehicles and dollar amounts corresponding to repair costs of the past damaged vehicles, respectively, generate combined exception data based on the first exception data and the second exception data, the combined exception data being indicative of the impact and including:

movements of the damaged vehicle during a time period associated with the impact, an angle of the impact, and an intensity of the impact, input the first claim value and the combined exception data to a second machine learning model, wherein the second machine learning model is trained to determine the second claim value based on the first claim value generated by the first machine learning model and a set of past exception data, determine a second claim value associated with the damaged vehicle using the second machine learning model based at least in part on the first claim value and the combined exception data, and display, in a display device of the mobile computing device, the second claim value.

20. The non-transitory computer readable medium of claim 19 containing further program instructions that when executed, cause a computer to:

determine the second claim value by analyzing the first claim value and the combined exception data using a convolutional neural network.

\* \* \* \* \*